(12) United States Patent
Pinnavaia et al.

(10) Patent No.: US 6,414,069 B1
(45) Date of Patent: Jul. 2, 2002

(54) HYBRID MIXED ION CLAY STRUCTURES FOR POLYMER NANOCOMPOSITE FORMATION

(75) Inventors: Thomas J. Pinnavaia, East Lansing, MI (US); Zhen Wang, Palatine, IL (US)

(73) Assignee: Board of Trustees of Michigan University, East Lansing, MI (US)

( * ) Notice: Subject to any disclaimer, the term of this patent is extended or adjusted under 35 U.S.C. 154(b) by 0 days.

(21) Appl. No.: 09/518,388

(22) Filed: Mar. 3, 2000

(51) Int. Cl.[7] .................................................. C08K 3/34
(52) U.S. Cl. ........................ 524/445; 524/186; 524/431; 501/148
(58) Field of Search ................................ 524/186, 147, 524/431, 443, 445, 449; 501/145, 146, 147, 148, 149

(56) References Cited

U.S. PATENT DOCUMENTS 5,866,645 A    2/1999  Pinnavaia
5,993,769 A   11/1999  Pinnavaia
6,251,980 B1 * 6/2001  Lan et al. .................... 524/445

OTHER PUBLICATIONS

Barrer, R.M. and K. Brummer, Trans. Faraday Soc. 59:959–968 (1963).
Theng, B.K.G., et al., Clay Miner. 7:1–17 (1967).
Ijdo et al., Advanced Materials 8:79–83 (1996).
Vansant, E.F., et al., Clays Clay Miner 20:47–54 (1972).
McBride, M.B.,, et al., Clay Miner. 10:357 (1975).
Xu, S., et al., Soil Sci. Soc. Am.J. 58:1382–1391 (1994).
McBride, M.B., et al., Clays Clay Minerals 21:323–329 (1973).
Ijdo and Pinnavaia; J. Solid State Chem. 139 281 (1998).

* cited by examiner

*Primary Examiner*—Edward J. Cain
*Assistant Examiner*—Katarzyna W. Lee
(74) *Attorney, Agent, or Firm*—Ian C. McLeod

(57) ABSTRACT

Hybrid layered silicates with galleries between the layers containing both inorganic and organic ions with different compositions in different galleries are described. The resulting hybrid layered silicates provide economical starting materials for polymers and the like.

38 Claims, 8 Drawing Sheets

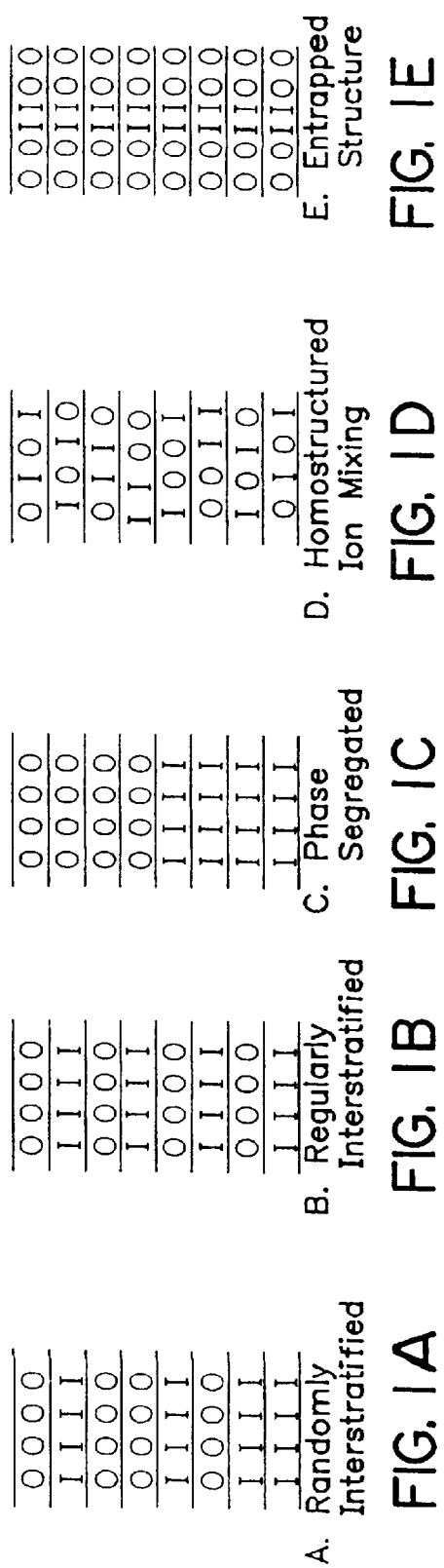

| | | | | | |
|---|---|---|---|---|---|
| O | I | O | O | I | O |
| I | O | I | I | O | I |
| O | I | O | O | I | O |
| I | O | I | I | O | I |
| I | I | I | I | I | I |
| O | I | O | O | I | O |
| I | O | I | I | O | I |
| O | I | O | O | I | O |
| O | O | O | O | O | O |

Predominately inorganic (left)   Predominately organic (right)

FIGURE 1F

HYBRID MIXED ION CLAY STRUCTURES FOR POLYMER NANOCOMPOSITE FORMATION

STATEMENT REGARDING FEDERALLY SPONSORED RESEARCH DEVELOPMENT

This invention was funded by NIEHS grant ES04911C. The U.S. Government has certain rights in this invention.

BACKGROUND OF THE INVENTION

(1) Field of the Invention

The present invention relates to novel hybrid layered silicates containing galleries within the layers incorporating both organic and inorganic ions. In particular, the hybrid layered silicates have different inorganic ion and organic ion compositions in different of the galleries.

(2) Description of Related Art

Smectite clays are natural or synthetic layered aluminosilicates such as montmorillonite, bentonite, hectorite, fluorohectorite, saponite, beidellite, nontronite, and related analogs. Smectite clays have layered lattice structures in which the tactoids (crystallites) consist of stacked two dimensional oxyanions separated by layers of hydrated cations. The oxygen atoms define layers approximately 10 Å-thick, containing two sheets of tetrahedral sites and a central sheet of octahedral sites. The 2:1 relation between the tetrahedral and the octahedral sheets in a layer defines 2:1 layered silicates. This same layered structural element is found for the mica minerals; therefore smectite clays and related 2:1 layered silicate minerals such as vermiculite and rectonite are sometimes referred to as mica-type silicates. For a typical 2:1 layered silicate, such as montmorillonite, the layer is made up of a central octahedral sheet, usually occupied by aluminum or magnesium, sandwiched between two sheets of tetrahedral silicon sites. Various isomorphous cation substitutions, e.g., $Si^{4+}$ by $Al^{3+}$ in the tetrahedral sheet, or $Al^{3+}$ by $Mg^{2+}$, or $Mg^{2+}$ by $Li^+$ in the octahedral sheet among others also result in negatively charged nanolayers. These negatively charged layers are separated by hydrated cations such as alkali or alkaline earth metal ions in the gallery (interlayer) regions between the 2:1 layered silicates. The negative charge on the layer is balanced by interlayer or "gallery" cations, normally $Ca^{2+}$ and $Na^+$. The gallery cations in a natural smectite can be replaced by simple ion exchange process with almost any desired cation, including alkylammonium alkyl phosphonium and other organic cations. Some idealized unit cell compositions and layer charge densities of 2:1 layered are listed in Table 1.

TABLE 1

Ideal Structural Formulas for some 2:1 Layered Silicates

| Mineral Name | Ideal Formula | Layer Charge Density per $O_{20}$ unit |
|---|---|---|
| Hectorite | $M_{x/n}{}^{n+} \cdot yH_2O[Al_{6.0-x}Mg_x](Si_{8.0})O_{20}(OH)_4$ | 0.4–1.0 |
| Fluorohectorite | $M_{x/n}{}^{n+} \cdot yH_2O[Al_{6.0-x}Mg_x](Si_{8.0})O_{20}(OH,F)_4$ | 0.4–1.2 |
| Montmorillonite | $M_{x/n}{}^{n+} \cdot yH_2O[Mg_{6.0-x}Li_x](Si_{8.0})O_{20}(OH)_4$ | 0.6–1.2 |
| Nontronite | $M_{x/n}{}^{n+} \cdot yH_2O[Fe_{4.0}](Si_{8.0-x}Al_x)O_{20}(OH)_4$ | 0.6–1.2 |
| Beidellite | $M_{x/n}{}^{n+} \cdot yH_2O(Al_{4.0}](Si_{8.0-x}Al_x)O_{20}(OH)_4$ | 0.8–1.2 |
| Saponite | $M_{x/n}{}^{n+} \cdot yH_2O[Mg_{6.0}](Si_{8.0-x}Al_x)O_{20}(OH)_4$ | 0.6–1.4 |
| Vermiculite | $Mg_{(x-z)2}{}^{2+}[Mg_{6-x}Fe_z{}^{III}](Si_{8-x}Al_x)O_{20}(OH)_4$ | 1.4–1.8 |
| Muscovite mica | $K_2[Al_{4.0}](Si_{6.0}Al_{2.0})O_{20}(OH)_4$ | 2.0 |
| Biotite mica | $K_2[Al_yMg_{6+(x/z)-(3y-2)}](Si_{6.0-x}Al_{2.0+x})O_{20}(OH)_4 (x<1, y<2)$ | 2.0 |
| Phlogopite mica | $K_2[Mg_{6.0}](Si_{6.0}Al_{2.0})O_{20}(OH)_4$ | 2.0 |

Included in Table 1 for comparison purposes are the idealized compositions of 2:1 layered silicates, smectite clays, vermiculite, muscovite mica, biotite mica, and phlogopite mica. Vermiculite has a layer charge density higher than a smectite but lower than a mica. Micas usually have layer charge of 2.0. The gallery cations in a vermiculite or a mica can also be replaced by ion exchange, but the exchange processes are generally slower than for smectite clays. Also, vermiculites and micas exist commonly as single crystals that range in size from 10 μm to 10 cm or larger. In contrast, smectite clays have sub-micron particle sizes. The particle size of vermiculite and mica can be reduced to the micron size range by mechanical grinding. Other ion exchangeable 2:1 layered silicate including illite, rectorite and synthetic derivative such as tetrasilicic mica and synthetic mica montmorillonite (SMM).

Most important among the properties of smectite clays and related 2:1 layered silicates with cation exchange properties is the ability to replace the gallery cations in the pristine clay with almost any desired cations by ion exchange reactions. The exchange cations are very important in determining the ability of the gallery regions to imbibe (intercalate) neutral molecules. Inorganic cations ($M^{n+}$) such as ($Na^+$, $Ca^{2+}$ and the like) prefer to be solvated by polar molecules such as water and certain polar organic molecules. Thus, these exchange forms are readily swollen by polar molecules, especially by water. Organic cations (alkylammonium, phosphonium ions and the like) are less hydrophilic, even hydrophobic, and prefer to intercalate organic molecules into the gallery regions. Inorganic cations such as $K^+$ and $Mg^{2+}$ in mica are anhydrous and strongly bound to the intergallery surfaces. Therefore, these silicates are difficult for gallery swelling and ion exchange reaction. However, the exchange of gallery cations in micas can be facilitated by reducing the particle size of the particles, preferably to average values of 2 μm or less.

Clay-organic intercalates are intercalation compounds in which organic molecules enter the clay galleries and form definite compositions with specific clay basal spacings. The organic compounds that have been reported to form clay intercalates include uncharged polar organic compounds and positively charged organic ions, and ion-paired organic salts. These classes of guest species are intercalated by ion exchange, physical adsorption, or other mechanisms. Intercalation of organic polymers in clay minerals has been recognized to occur as natural processes in soils. Polymer adsorption and desorption also occurs under synthetic conditions (Theng, B. K. G. "The Chemistry of Clay-Organic Reactions". John Wiley & Sons, pages 136 to 206 (1974)). Interaction between clays and polymeric species has been discussed as natural or synthetic polymer adsorption and desorption (Theng, B. K. G. "Formation and Properties of Clay-Polymer Complexes", Elsevier pages 63 to 133 (1979)).

Mixed organic/inorganic ion exchanged forms of 2:1 layered silicates can potentially adopt one of several possible structures depending on the distribution of the distinguishable cations in the interlayer galleries. Organo cations, particularly alkylammonium ions such as $(CH_3)_3NH^+$ and $(CH_3)_4N^+$ among others, are known to form interstratified structures when mixed with $Na^+$ among others, are known to form interstratified structures when mixed with $Na^+$ ions in the galleries of montmorillonite (Barrer, R. M. and K. Brummer, Trans. Faraday Soc. 59:959–968 (1963); and Theng, B. K. G., et al., Clay Miner. 7:1–17 (1967)). In these interstratified phases the galleries are occupied by "onium-rich" and "sodium-rich" compositions of exchange cations. That is, the organic and inorganic exchange cations are "demixed" or largely segregated into separate galleries. Also, the stacking sequence of "onium-rich" and "sodium-rich" galleries is random in an interstratified mixed ion system. Interstratified onium ion/alkali metal ion smectite clays typically exhibit XRD spacings that increase with the amount of the larger onium ion occupying exchange positions in the galleries. The observed XRD basal spacings for demixed interstratified compositions is equal to the weighted average of the d spacings expected for the homoionic end member inorganic and organic exchanged forms of the layered silicate.

The segregation of organic onium ions and inorganic cations also has been recently observed for mixed ion exchange form of fluorohectorite containing equal molar amounts of a quaternary phosphonium ion, namely $(C_{18}H_{37})P(C_4H_9)_3^+$, and an alkali metal ion, namely, $Li^+$, $Na^+$, or $K^+$ (Ijdo et al, Advanced Materials 8:79–83 (1996)). In these latter compositions the organic and inorganic ions also are segregated into separate galleries, but unlike interstratified systems the stacking sequence of inorganic and organic galleries regularly alternates. This regular sequencing of galleries gives rise to ordered heterostructures that exhibit several orders of rational 001 reflections. The observed XRD basal spacing for ordered heterostructures is the sum of the d spacings expected for the homoionic end member inorganic and organic exchanged form of the silicate.

Yet another common behavior of mixed organic/inorganic exchange cation clays is the segregation of the two types of ions into homoionic tactoids containing long range stacking sequences of galleries that are occupied predominantly by one or the other cation. That is, the replacement of inorganic exchange ions by organic exchange ions occurs sequentially, gallery by adjacent gallery. Thus, if a fraction of the inorganic cations in a sample is replaced by organic ions, then one is left with a mixture of tactoids consisting of two homoionic end-member ion exchanged forms. These phase segregated mixed ion clays typically exhibit XRD powder patterns characteristic of a physical mixture of the homoionic, end-member forms of the parent organic and inorganic cation exchanged clays.

Randomly interstratified, heterostructured (regularly interstratified), and phase segregated mixed organic/inorganic ion clays and related 2:1 layered silicates have limited utility for commercial applications. The distributions of inorganic cations (I) and organic cations (O) in each of these three systems is schematically illustrated in FIGS. 1A, 1B and 1C, respectively. Because the organic exchange cations in each of these structures are largely segregated from the inorganic cations in separate organic-rich galleries, only those organic-rich galleries will be hydrophobic and suitable for intercalation and swelling by organic reagents and solvents.

It is the hydrophobicity of homoionic organic cation exchanged clays that makes them useful as materials for rheological control agents (e.g. in oil well drilling fluids, cosmetic formulations, and household cleaning products), adsorbents for toxic organic chemicals from water, and as components for organic polymer-layered silicate nanocomposite formation. Consequently, only the organic cation rich galleries of interstratified, heterostructured and phase-segregated mixed ion clays will be useful. The fraction of the clay containing inorganic-cation rich galleries will not participate in the desired intercalation chemistry with organic reagents, solvents and polymers. For this reason, fully exchanged homoionic organo clays, most typically quaternary ammonium ion clays, are used for the said applications.

Demixed organic/inorganic ion exchanged forms of 2:1 layered silicates can adopt one of several possible structures that are distinguished on the basis of the distribution of the two types of cations in the interlayer galleries. Barrer and Brummer (Barrer, R. M. and K. Brummer. Trans. Faraday Soc. 59:959–968 (1963)) studied by x-ray diffraction the basal spacings and adsorption properties of a series of mixed $CH_3NH_3^+,Na^+$— and $(CH_3)_4N^+,Na^+$-montmorillonites. The mixed ion compositions were prepared by ion exchange of $Na^+$-montmorillonite with aqueous solution of the onium ion salt. They concluded that the compositions were "interstratified" structures. In these interstratified phases, the galleries are occupied by onium-rich and sodium-rich compositions of the exchange cations. That is, the organic and inorganic cations are largely segregated into separate galleries. Also, the stacking sequenced of onium-rich and sodium-rich galleries is random. The structure of a randomly interstratified, mixed ion 2:1 layered silicate is illustrated schematically in FIG. 1A.

Theng et al (Theng, B. K. G., et al., Clay Miner 7:1–17 (1967)) also have studied the replacement of $Na^+$ and $Ca^{2+}$ ions in montmorillonite by ion exchange reaction with alkylammonium ions in aqueous solution. They concluded, in agreement with Barrer and Brummer, that the products had interstratified, demixed structures.

Vansant and Uytterhoven (Vansant, E. F., et al., Clays Clay miner 20:47–54 (1972)) studied by thermodynamic methods the partial replacement of $Na^+$ by $(CH_3)NH_3^+$, $(C_2H_5)NH_3^+(C_3H_7)NH_3^+$ and $(C_4H_9)NH_3^+$ onium in montmorillonite. They were inclined to interpret their results in terms of homogeneous mixtures of onium ions and $Na^+$ ions in the galleries (i.e. in terms of a homostructure), but they believed that segregation of the ions into sodium-rich and onium-rich ions occurred upon drying the reaction products.

Pinnavaia et al (U.S. Pat. No. 5,993,769) have shown that one way of reducing the amount of expensive organic cations needed for hydrophobic intercalation and swelling is to mix organic and inorganic cations within the same galleries. Such mixed exchange cation forms are said to be "homostructured" because each gallery in the tactoid is compositionally equivalent and exhibits uniform intercalation properties. The gallery distribution of inorganic ions (I) and organic ions (O) in a homostructured mixed ion intercalate is shown schematically in FIG. 1D. Homostructured organic/inorganic ion exchanged clays can be made hydrophilic, hydrophobic, or even amphophilic depending on the relative population of organic or inorganic ions in the gallery. By adjusting the polarity of the galleries one can favor adsorption of guest species based on their intrinsic polarity. Also amphiphilic galleries allow co-adsorption of both organic and inorganic reagents for possible intragallery reaction. Still further, it is possible using hydrophobic derivatives to adsorb organic reagents in galleries where the inorganic cation is an element capable of catalyzing reaction of the organic reagent (e.g. a transition metal ion).

The homogeneous or uniform mixing of organic and inorganic cations in a smectite clay over an appreciable range of organic to inorganic cation ratios is dependent on the nature of the inorganic and organic exchange cations, as well as on the charge density of the 2:1 layers. Thus, McBride and Mortland (McBride, M. B., et al., Clay Miner. 10:357 (1975)) observed that for the exchange of $Cu^{2+}$ ions in montmorillonite by tetrapropylammonium ions, random interstratification of $Cu^{2+}$ and tetrapropylammonium ions occurred up to 55% exchange. At 55% exchange, and beyond, the $Cu^{2+}$ and tetrapropylammonium ions were distributed as in a homostructured mixed ion clay. This special behavior for homostructure formation, which is schematically illustrated in FIG. 1D, was attributed to the special ability of $Cu^{2+}$ to reduce the degree of hydration by lowering the number of coordinated water molecules from six to four or less. Other inorganic cations do not show like reduction and stability in coordination number and did not form thermodynamically stable mixed ion clay homostructures. However, Pinnavaia et al (U.S. Pat. No. 5,993,769) showed that certain inorganic cations (e.g. protons and alkali metal and alkalene earth cations could be mixed with certain onium cations in the galleries of smectite clays over a wide range of inorganic and organic ion ratios.

In their studies of the replacement of alkali metal cations ($Na^+$) and alkaline earth cations ($Ca^{2+}$) in vermiculite by a long chain quaternary of the type used for forming organo clays (hexadecyltrimethylammonium, $HDTMA^+$) Xu and Boyd (Xu, S., et al., Soil Sci. Soc. Am. J. 58:1382–1391 (1994)) provided examples of "entrapped" mixed ion structures. At $Na^+$ and $Ca^{2+}$ concentrations of 0.005M and 0.001M, respectively, the inorganic cations became difficult to exchange after a certain mole fraction of (~0.6) of exchange sites were occupied by $HDTMA^+$. The inability to displace all of the inorganic cations was attributable to an entrapment phenomenon that limited access to the inorganic exchange sites. Entrapment of the inorganic cation was caused by rapid edge collapse of the galleries around the organic onium ion. Greenland and Quirk, (Greenland, D. J., et al., Clays Clay Minerals 9:484–499 (1962)), observed that hexadecylpyridinium entrapped up to 25% of the $Na^+$ in montmorillonite. Also, McBride and Mortland, (McBride, M. B., et al., Clays Clay Minerals 21:323–329 (1973)), observed that while tetrapropyl ammonium replaced ~50% of the $Ca^{2+}$ from montmorillonite, and only ~10% of the inorganic ions were replaced from vermiculite. McAtee, (McAtee, J. L., J. C. American Mineralogist 44:1230–1236 (1959)) observed that long chain quaternary ammonium ions displaced most of the $Na^+$ ions from montmorillonite, but entrapped a large fraction of $Ca^{2+}$ at the exchange sites of the same mineral.

Inorganic cation entrapment by organic cations in 2:1 layered silicates can occur by several mechanisms that include a "covering-up" of the inorganic ion by the larger organic cation or a "contraction" of the gallery due to the presence of organic cation. Gallery contraction, however, is not a general mechanism because it requires a small organic cation capable of keying into the layered silicate surfaces to reduce the gallery height. Most onium ions expand the gallery relative to the size of the inorganic cation. Xu and Boyd have pointed out that both the "covering-up" and "gallery contraction" mechanisms are unlikely for onium ion with long alkyl chains. Instead, they favored entrapment. In this mechanism replacement of the alkali metal or alkaline earth cation by the alkyl chains on the onium ions near the edges of the gallery create a hydrophobic barrier that impedes diffusion of the equated inorganic ions from the gallery. Thus, as illustrated in FIG. 1E, entrapped mixed organic-inorganic cation clays and related 2:1 layered silicates contain both types of ions within a given gallery, but in contrast to the homostructured forms illustrated in FIG. 1D, the ions of entrapped structures are not homogeneously distributed within the galleries and, therefore, are distinct.

Because the organic and inorganic ions are segregated within a gallery, entrapped mixed ion structures suffer the same disadvantages that are caused by demixing in phase segregated, interstratified, and heterostructured mixed ion structures. However, as emphasized by Xu and Boyd, entrapped structures are caused by hydrophobic and stearic factors and thus are metastable structures formed in a non-equilibrium exchange process. Phase segregated, interstratified, and heterostructured systems are thermodynamically stable phases formed in equilibrium exchange in an aqueous environment.

The five basic structures shown in FIGS. 1A to 1E for mixed ion exchanged forms of 2:1 layered silicate clays are distinguished by physical and chemical methods. The most important physical technique is X-ray powder diffraction, because it can distinguish the different types of gallery stacking patterns represented by the structures in FIGS. 1A to 1E. The swelling properties of the mixed ion clays also is an indication of structure. For instance, the galleries occupied by organic cations are hydrophobic, they can be swelled by organic solvents, monomers, prepolymers or polymers, but the inorganic carbon galleries will not be swollen by such species. The structures containing organic and inorganic cations in separate galleries (namely, the structures of FIGS. 1A, 1B, and 1C) are readily distinguished by X-ray diffraction. For the randomly interstratified structure represented by FIG. 1A, the X-ray pattern will contain at least one 001 diffraction line corresponding to the weighted average of the basal spacings for the organic (O) and inorganic (I) galleries, $d_{obs}=f_O d_O+f_I d_I$, where $f_O$ and $f_I$ are the fractions of organic ions and inorganic ions, respectively, and $d_O$ is the spacing of the organic exchange form of the clay and $d_I$ is the spacing of the inorganic exchange form. Organic onium ions are normally larger than most commonly used inorganic cations. Therefore, a randomly interstratified structure rich in onium ions will exhibit a basal spacing smaller than that observed for a fully exchanged homoionic organocation exchange form of the clay, but larger than the basal spacing expected for the homoionic inorganic exchange form of the clay. As the stacking of the demixed organic and inorganic galleries becomes more regular and approaches the regularly interstratified 50:50 heterostructure represented by FIG. 1B, the number of 001 diffraction orders increases and the observed basal spacing will be larger than the basal spacing of homoionic organoclay end member. When a fully ordered 50:50 heterostructure is obtained, the diffraction pattern will exhibit a number of 001 reflections corresponding to a basal spacing equal to the sum of the basal spacings for the corresponding organic and inorganic end-member clays ($d_{obs}=d_O+d_I$). Ijdo and Pinnavaia (Adv. Mater. 79 8 (1996); J. Solid State Chem 139 281 (1998); Chem. Mater. 11 3227 (1999) have reported observing three or more orders of 001 reflections for 50:50 heterostructures of a synthetic fluorohectorite provided by Corning, Inc. Such regularly ordered heterostructures, however, appear to be uniquely formed from this particular synthetic fluorohectorite, which is prepared from a molten silicate flux at high temperatures. Naturally occurring 2:1 layered silicates, as well as synthetic analogs prepared by more commonly used hydrothermal methods, are not known to form regularly ordered heterostructures. Apparently, fluorohectorites prepared from molten silicate fluxes have exceptionally uniform layer charge densities, which is a pre-requisite for the formation of highly ordered heterostructures.

The phase-segregated structure of FIG. 1C is readily identified by the appearance of at least two sets of 001 diffraction lines corresponding to the basal spacing of the stacked organic galleries and the basal spacing of the stacked inorganic galleries (i.e. $d_I$ is observed separate from $d_O$). An equivalent phase-segregated X-ray diffraction pattern also will be observed for the entrapped structure of FIG. 1E in which organic and inorganic exchange cations occupy the same gallery, but are segregated at the inner and outer regions of the galleries. This type of intragallery ion segregation again gives rise to two sets of basal spacings corresponding to the homoionic organic and inorganic end-member clays.

The homostructured mixed ion clays represented in FIG. 1D have been disclosed by Pinnavaia et al (U.S. Pat. Nos. 5,993,769 and 5,866,645) For these compositions, the X-ray diffraction pattern will exhibit one or more orders of 001 reflection corresponding to a basal spacing that is larger than the basal spacing of the homoionic inorganic end member, but no larger than the spacing of the homoionic organic end member, i.e. $d_O > d_{obs} > d_I$), assuming, of course, that the organic cation is larger than the inorganic cation. In this respect, the pattern for a homostructured clay is similar to the XRD pattern expected for a randomly interstratified clay. However, in a homostructured clay, all of the galleries are equivalent in polarity and can be equally swelled by co-intercalation of an organophilic or hydrophilic guest, depending on the relative population of the organic and inorganic exchange cations in the galleries. However, for a randomly interstratified structure with demixed organic and inorganic galleries, only the organic galleries are swelled by organophilic guests and only the inorganic galleries are swelled by hydrophilic guests. These differences in swelling properties are easily distinguished from X-ray diffraction patterns of the solvated compositions.

OBJECTS

It is an object of the present invention to provide hybrid mixed inorganic and organic gallery ion forms of 2:1 layered silicate compositions that have unique swelling properties because of the beneficial distribution of the mixed organic and inorganic ions in the galleries between the 2:1 silicate layers. Further, it is an object of the present invention to use these hybrid 2:1 layered silicate compositions for the formation of thermoset and thermoplastic polymer nanocomposites. Further still, it is an object of the present invention to provide such silicates which are relatively simple and economical to prepare. These and other objects will become increasingly apparent by reference to the following description and the drawings.

SUMMARY OF THE INVENTION

The present invention discloses a hybrid 2:1 layered silicate composition consisting essentially of mixed organic and inorganic exchange cations in galleries which are between the silicate layers, wherein a first set of the galleries are mixed inorganic ions and organic onium ions and a second set of the galleries are mixed inorganic and organic cations that alternate irregularly with the first set of the galleries, wherein the first and second sets of the galleries contain different amounts of the organic onium ions, wherein the overall ratio of organic to inorganic ions defining the hybrid composition is between 25 to 75 and 75 to 25, wherein the initial hybrid layered silicate composition exhibits a x-ray basal spacing $d_{obs}$ that is either (i) greater than a sum of the basal spacings observed for the organic ion saturated exchanged form of the 2:1 silicate($d_o$) and the saturated inorganic ion exchanged form of the silicate ($d_I$) alone or (ii) is less than a sum of the basal spacing for $d_o+d_I$ and is greater than the basal spacing $d_o$ after heating at 100° C.

The present invention further relates to a composite composition which comprises:
(a) a hybrid 2:1 layered silicate composition which initially consists essentially of mixed organic and inorganic exchange cations ions in galleries which are between the silicate layers, wherein a first set of the galleries are mixed inorganic ions and organic ions and a second set of the galleries are mixed inorganic and organic cations that alternate irregularly with the first set of the galleries, wherein the first and second sets of the galleries contain different amounts of the organic onium ions, wherein the overall ratio of organic to inorganic ions defining the hybrid composition is between 25 to 75 and 75 to 25, wherein the initial hybrid layered silicate composition exhibits a x-ray basal spacing $d_{obs}$ that is either (i) greater than a sum of the basal spacings observed for the organic ion saturated exchanged form of the 2:1 silicate ($d_o$) and the saturated inorganic ion exchanged form of the silicate ($d_I$) alone or (ii) is less than a sum of the basal spacing for $d_o+d_I$ and is greater than the basal spacing $d_o$ after heating at 100° C.; and
(b) a polymer forming material or polymer material inserted into the mixed ion galleries of the initial hybrid 2:1 layered silicate composition. The layered silicate enhances the strength, barrier properties, and chemical stability of the polymer.

The present invention further relates to a process for forming a hybrid mixed organic-inorganic ion 2:1 layered silicate which comprises:
(a) providing an inorganic ion exchanged form of a 2:1 layered silicate with a cation exchange capacity of at least about 90 meq per 100 g containing metal ions in galleries between the layers and without organic ions in the galleries; and
(b) introducing organic onium ions so that a first set of the galleries are mixed inorganic and organic ions and a second set of the galleries are mixed inorganic and organic ions between the silicate layers, wherein the first and second sets of the galleries contain different amounts of the organic ions, wherein the overall ratio of organic to inorganic ions is between 25 to 75 and 25 to 75, wherein the resulting hybrid layered silicate exhibits an x-ray basal spacing ($d_{obs}$) that is either (i) greater than the sum of the basal spacings for the organic ion saturated exchange form of the layered silicate ($d_o$) and the inorganic ion saturated exchanged form of the layered silicate after drying at 100° C., or (ii) is less than a sum of the basal spacing for $d_o$ and $d_I$ is greater than the basal spacing of the $d_o$ after dehydration at 100° C.

The present invention also relates to a process for forming a hybrid mixed organic-inorganic ion form of a 2:1 layered silicate which comprises:
(a) mixing an organic ion saturated and an inorganic ion saturated exchanged form of a 2:1 layered silicate in water in a molar ratio of organic ion saturated silicate to inorganic ion saturated silicate between 25 to 75 and 75 to 25; and (b) filtering and drying the reaction product at 100° C. to form hybrid mixed organic and inorganic mixed ion composition wherein the initial hybrid layered silicate composition exhibits a x-ray basal spacing $d_{obs}$ that is either (i) greater than a sum of the basal spacings observed for the organic ion saturated exchanged form of the 2:1 silicate ($d_o$) and the saturated inorganic ion exchanged form of the silicate ($d_I$) alone or (ii) is less than a sum of the basal spacing for $d_o+d_I$ and is greater than the basal spacing $d_o$ after heating at 100° C.

Finally, the present invention relates to a method for forming hybrid mixed organic-inorganic ion 2:1 layered silicate-polymer composite compositions which comprises:

(a) providing a hybrid 2:1 layered silicate composition which initially consists essentially of a mixed organic and inorganic exchange cations in galleries between the silicate layers, wherein a first set of the galleries are mixed inorganic ions and organic ions and a second set of the galleries are mixed inorganic and organic ions that alternate irregularly with the first set of the galleries, wherein the first and second sets of the galleries contain different amounts of organic onium ions wherein the overall ratio of organic to inorganic ions defining the hybrid composition is between 25 to 75 and 75 to 25, wherein the initial hybrid layered silicate composition exhibits a x-ray basal spacing $d_{obs}$ that is either (i) greater than a sum of the basal spacings observed for the organic ion saturated exchanged form of the 2:1 silicate ($d_o$) and the saturated inorganic ion exchanged form of the silicate ($d_I$) alone or (ii) is less than a sum of the basal spacing for $d_o+d_I$ and is greater than the basal spacing $d_o$ after heating at 100° C.; and (b) introducing a polymer-forming material or polymer material into galleries of the hybrid mixed ion silicate to form a composite material. The layered silicate enhances the strength, barrier properties, and chemical stability of the polymer.

DESCRIPTION OF DRAWINGS

FIGS. 1A to 1F are schematic representations of the distribution of organic (O) and inorganic (I) cations in the galleries of 2:1 layered silicates with different gallery stacking patterns. FIG. 1F shows the proposed structure for a hybrid mixed ion 2:1 layered silicate as described in the present invention.

DESCRIPTION OF PREFERRED EMBODIMENTS

Figure 2:
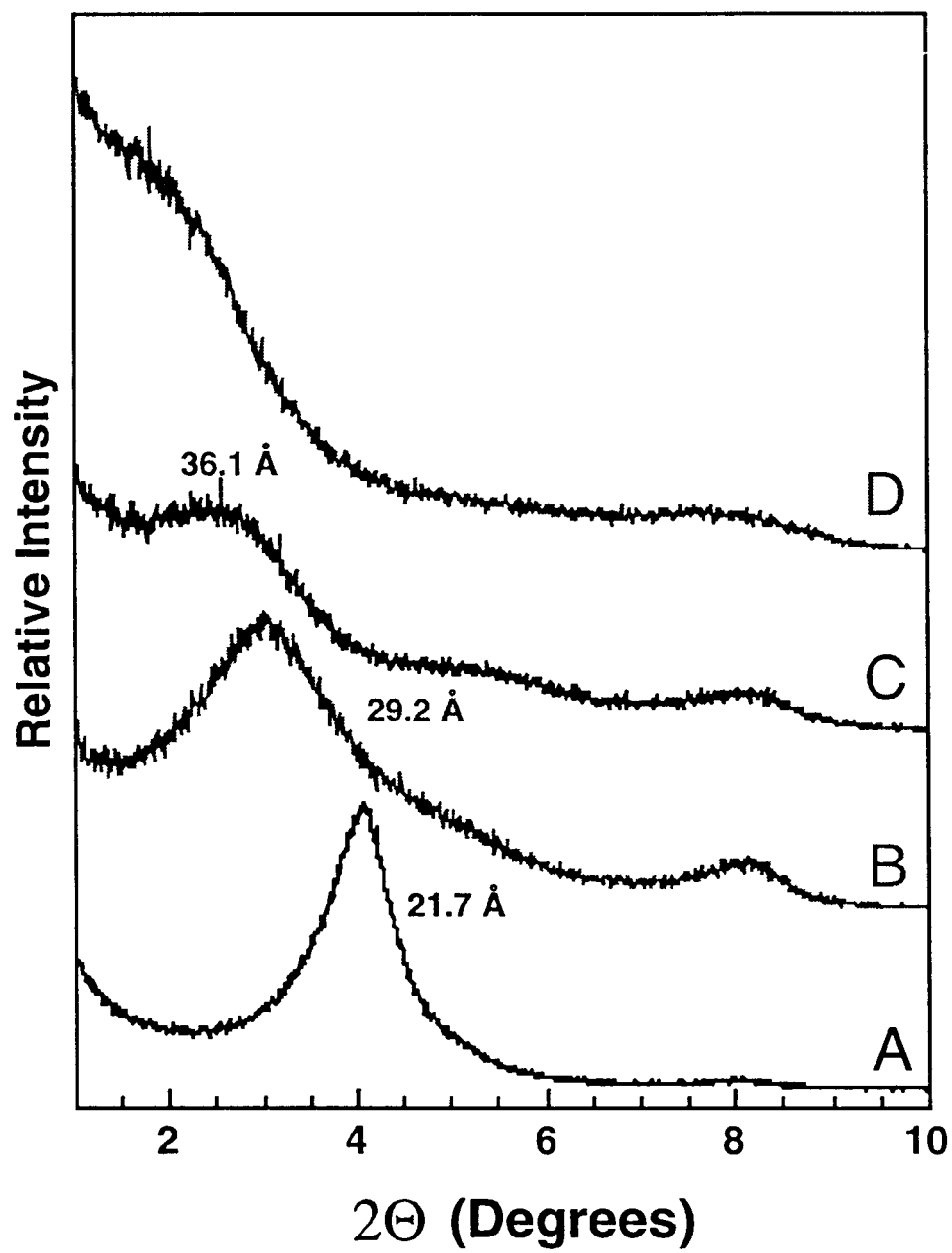
FIG. 2 is a graph of XRD patterns of (A) a fully octadecylammonium exchanged CWC montmorillonite (Nanocor, Inc.) (obtained by exchange reaction of the sodium form of CWC clay from Nanocor, Inc., (Arlington Heights, Ill.). (B), (C) and (D) are XRD patterns for the hybrid mixed ion CWC clay structures of this invention prepared by reaction of 1 equivalent of $Na^+$-clay with 0.70, 0.50 and 0.30 equivalents of octadecylammonium ions.

The present invention discloses new hybrid organic and inorganic cation exchange forms of 2:1 layered silicates. In these new hybrid compositions between 25% and 75% of the total gallery cations of the layered silicate, whether synthetic or naturally occurring, are organic onium ions. This mixing of gallery inorganic and organic cation alters the basal surface polarity of the silicate nanolayers, allowing the gallery region between nanolayers to be swollen by various guest species of different polarity. In this regard the swelling properties and, therefore, the usefulness of these new compositions as thickening reagents, rheological control agents, polymer reinforcement agents, barrier film agents and the like, are similar to those previously disclosed for homostructured mixed ion clays. Unlike homostructured mixed inorganic and organic clays, however, the ratio of the two ions varies from gallery to gallery and their variation in gallery cation content leads to gallery stacking patterns, and hence to XRD characteristics, that differ fundamentally from those of homostructured mixed ion clays. The great advantage of these new compositions is that they allow 2:1 layered silicates that do not form homostructures, or that only form homostructures with great difficulty, or of poor stability, to be useful for the said applications.

The X-ray diffraction and swelling properties of the mixed ion compositions of the present invention indicate hybrid-type structures that combine the interstratified structural properties of the de-mixed interstratified clays of FIGS. 1A and 1B with those of a mixed ion homostructure in FIG. 1D. More specifically, the new compositions of the present invention contain galleries that mix both organic and inorganic cations within the same gallery, but the gallery heights of the predominately organic and inorganic galleries differ (see FIG. 1F). The difference in gallery heights arise because the galleries are not uniformly occupied by the same ratio of inorganic and organic cations as in a homostructured, mixed ion clay (compare FIGS. 1F and 1D). Instead, the galleries of the new hybrid structures of the present invention are predominately occupied either by organic cations or by inorganic cations, at least for the majority of galleries in these hybrid structures. However, the number of organic cations occupying the two sets of galleries is sufficient to impart organophilic swelling properties. These highly desired organophilic swelling properties are best realized when the overall molar ratio of organic:inorganic cations is in the preferred composition range 25:75 to 75:25, and more preferably 50:50, although the overall compositions corresponding to molar ratios 10:90 and 90:10 are still useful.

An additional feature of the new compositions of this invention is that the predominately organic galleries and the predominately inorganic galleries are neither randomly stacked as in a randomly interstratified structure (see FIG. 1A) nor are they regularly stacked as in a regularly interstratified heterostructure (see FIG. 1B). That is, there is an intermediate degree of order between complete randomness and complete order in the stacking arrangement of the galleries. Depending in part on the overall ratio of onium to inorganic cations, the layer charge density of the 2:1 layered silicate, and the method used to prepare the hybrid mixed ion compositions, the hybrid mixed ion compositions of this invention exhibit two types of x-ray basal spacing behavior that is distinct from known mixed ion compositions. In one embodiment the observed spacing, $d_{obs}$, is larger than the sum of the basal spacings for the onium ion saturated form of the layered silicate ($d_o$) and the inorganic ion saturated derivative of the layered silicate ($d_I$). In a second embodiment of the invention the $d_{obs}$ value for the hybrid composition is less than the sum ($d_o+d_I$), but larger than $d_o$ or $d_I$. Table 1 compares the x-ray basal spacings of the hybrid mixed ion compositions of the invention in comparison to the spacings of previously disclosed mixed organic-inorganic cation forms of 2:1 layered silicates.

TABLE 1

Comparison of XRD Basal Spacings for Mixed Organic-Inorganic Ion Forms of 2:1 Layered Silicates

| Type of Mixed Ion 2:1 Layered Silicate | Observed XRD Basal Spacing(s)[a] |
| --- | --- |
| Phase segregated | $d_{obs} = d_o$, $d_{obs} = d_I$ |
| Entrapped | $d_{obs} = d_o$, $d_{obs} = d_I$ |
| Regularly Interstratified | $d_{obs} = (d_I + d_o)$ |
| Randomly Interstratified | $d_o > d_{obs} > d_I$ |
| Homostructured | $d_o > d_{obs} > d_I$ |
| Hybrid (This Invention, First Embodiment) | $d_{obs} > (d_I + d_o)$ |
| Hybrid (This Invention, Second Embodiment) | $(d_o + d_I) > d_{obs} > d_o$ |

[a]$d_o$ and $d_I$ are the spacings observed for the layered silicate saturated with the organic onium ion and inorganic ion, respectively.

A hybrid mixed ion composition with $d_{obs}>(d_o+d_I)$ was obtained when a montmorillonite clay with 1.08 gallery $Na^+$ ions per $O_{20}$ $(OH)_4$ unit cell was allowed to react by ion exchange with a solution of octadecylammonium chloride at 80° C. and at a molar ratio of $Na^+$ to onium ions of 1:0.50. Upon drying the reaction product at 100° C., the observed X-ray basal spacing ($d_{obs}$) was 36.1 Å, substantially larger than the sum of the spacings observed from the onium ion saturated clay (21.7 Å) and the $Na^+$ saturated clay (12.5 Å) after drying at 100° C. This means that the average repeat distance along the layered silicate stacking direction exceeds the sum of the repeat distances in the end-member $Na^+$-saturated and onium ion saturated clays. The structure of the composition cannot be a regularly interstratified heterostructure with alternating organic and inorganic galleries as shown in FIG. 1B, because the previous work of Ijdo and Pinnavaia (J. Solid State Chem. 139 281 (1998)) has shown that for such regularly interstratified heterostructures, the basal spacing is precisely equal to the sum of the spacings for the organic ion saturated and inorganic ion saturated clays, but the spacing never exceeds this sum. For the basal spacing of the hybrid structure to exceed the sum ($d_o+d_I$), we postulate that there is a tendency toward the interstratification of galleries of at least two different types in the hybrid structure with the two types of different gallery heights. We further postulate that the two sets of galleries are primarily occupied either by organic onium ions or by inorganic ions. For both sets of galleries, the heights are determined by the population density and orientation of the larger ion, namely, the organic onium ion. Thus, in a hybrid composition in which $d_{obs}>(d_o+d_I)$, the contribution to $d_{obs}$ by the onium ion rich galleries is on the order of $d_o$, but the contribution by the galleries that are rich in inorganic ions is substantially greater than $d_I$, because some larger onium ions co-occupy the galleries and increase the gallery height. Although there is a tendency toward a stacking sequence in which a predominately organic gallery is followed above and below by a gallery rich in inorganic ions, the stacking sequence is far from being regular. The lack of long range stacking order is evidenced by the fact that only one or two orders of $d_{001}$ harmonic peaks are observed in the x-ray diffraction pattern of a hybrid structure. In contrast, a regularly stacked interstratified heterostructure exhibits multiple (at least three and more typically six or more) harmonic $d_{001}$ reflections. Decreasing the amount of octadecylammonium ions to a clay to onium ion reaction stoichiometry of 1:0.30, increased the basal spacing to a $2\theta$ value (~2.0°) corresponding to a basal spacing near 45 Å (see FIG. 2D). This increase in basal spacing for the hybrid structure with decreasing onium ion content suggests that the predominately inorganic galleries have a tendency to stack adjacent to one another. The ordering of the stacking, however, is poor, as is evident from the broadness of the $d_{001}$ reflection (see FIG. 2D).

Increasing the onium ion concentration in the hybrid structure by increasing the reaction stoichiometry to a clay:onium ion ratio of 1:0.70 causes $d_{obs}$ (29.2 Å) to fall below the value of $d_o+d_I$ (see FIG. 2B). However, the $d_{obs}$ (29.2 Å) value remains larger than $d_o$ (21.7 Å, FIG. 2A), precluding the formation of a phase segregated onium ion phase or a randomly interstratified phase with the organic and inorganic ions completely de-mixed into segregated galleries. It is postulated that the galleries rich in inorganic ions continue to tend to pair with galleries that are rich in organic ions and that these paired galleries are randomly inter-dispersed between sequences of galleries that are rich in organic ions. Such a gallery stacking pattern would cause $d_{obs}>d_o$, while precluding the possibility for $d_{obs}>(d_o+d_I)$ when the ratio of inorganic to organic exchange cations in the reaction system is 1.0:0.7 or smaller.

Figure 3:
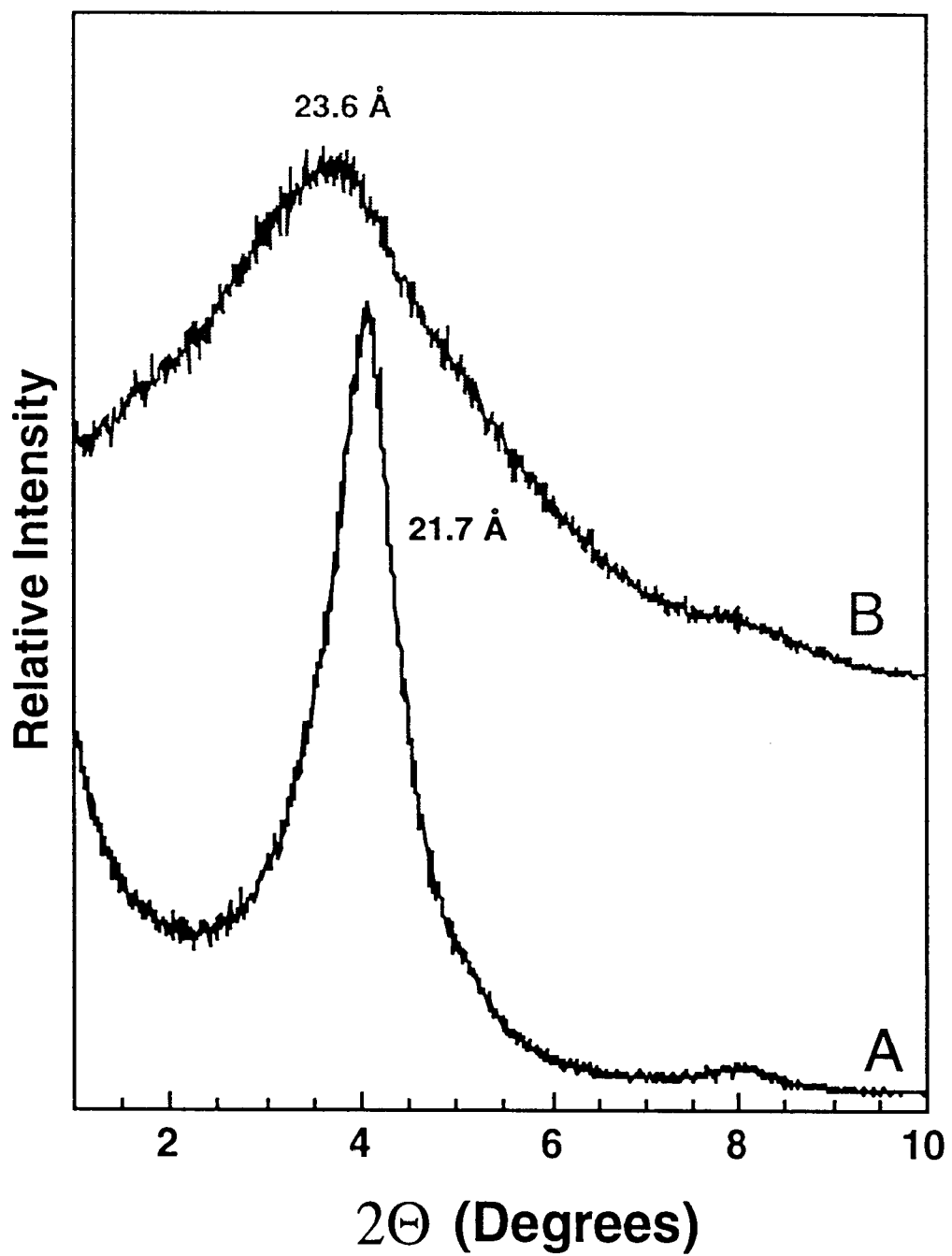
FIG. 3 is a graph of XRD patterns of (A) a fully octadecylammonium exchanged CWC montmorillonite (obtained from the sodium form of CWC clay from Nanocor, Inc., CEC—140 meq./100 g) and (B) a hybrid mixed ion CWC clay composition with the overall molar ratio of onium ions to sodium ions near 50:50. The hybrid mixed ion CWC clay structures were prepared by the parent clay redistribution pathway by mixing the parent homoionic organoclay and inorganic clays in liquid suspension in the desired stoichiometric ratio.

Equilibrating a mixture of onium ion saturated and inorganic ion saturated forms of a 2:1 layered silicate is another effective means of producing the hybrid mixed ion compositions of this invention. FIGS. 3A and 3B compare the x-ray diffraction patterns of a CWC montmorillonite (Nanocor, Inc.) that is saturated with octadecylammonium exchange cations (FIG. 3A) with the pattern for a hybrid mixed ion composition containing a 50:50 ratio of octadecylammonium and $Na^+$ gallery cations (FIG. 3B). The latter composition was prepared by equilibrating a 50:50 mixture of the homoionic end member clays. The observed spacing for the hybrid structure (23.6 Å) is substantially larger than the spacing for the clay saturated with octadecylammonium ions (21.7 Å). Also, the diffraction line for the hybrid structure is substantially broader than the width of diffraction line for the organoclay. It is noteworthy that the basal spacing for hybrid composition prepared by a redistribution reaction of a 50:50 molar mixture of the homoionic end member clays (23.6 Å, FIG. 3B) corresponds to a composition of the second embodiment of this invention, namely, that $(d_o+d_I)>d_{obs}>d_o$, whereas the hybrid composition formed by ion-exchange reaction of the Na$^+$-clay with 0.5 equivalents of octadecylammonium ions has a basal spacing of 36.1 Å (see FIG. 2C), which corresponds to a composition of the first embodiment of this invention, namely, that $d_{obs}>(d_o+d_I)$. Therefore, the method of preparation affects the stacking arrangements of the two sets of galleries containing predominately onium ions and predominately inorganic ions.

Figure 4:
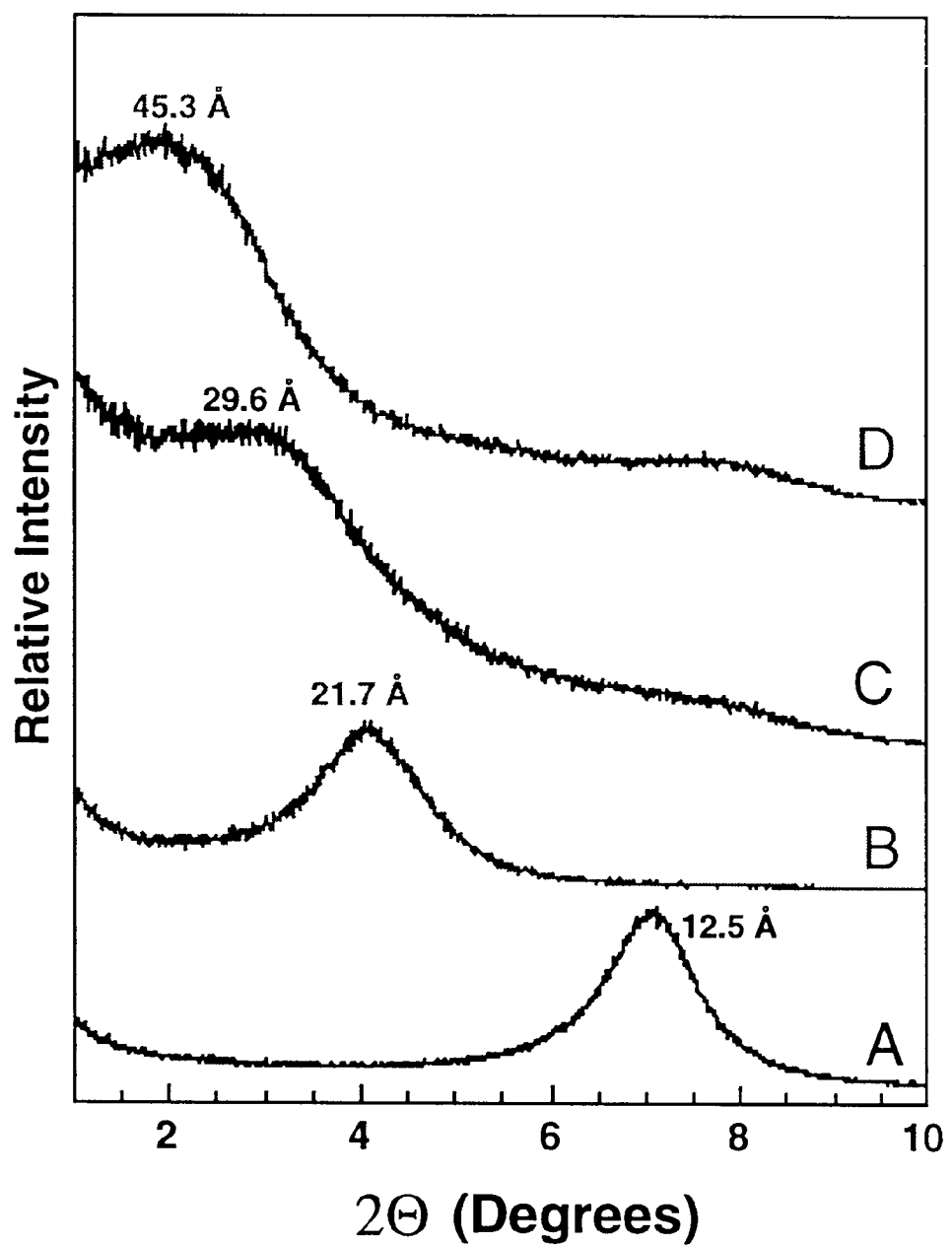
FIG. 4 is a graph showing XRD patterns of (A) the pristine sodium form VIC Montmorillonite (Nanocor, Inc., CEC—140 meq./100 g); (B) fully octadecylammonium exchanged VIC Montmorillonite; (C) and (D) are hybrid mixed ion VIC clay structures with the composition of onium ions to sodium ions near 50:50 and prepared by the parent redistribution pathway and direct ion exchange pathway, respectively.

FIG. 4 provides a comparison of the x-ray diffraction patterns of the mixed octadecylammonium—Na$^+$ hybrid compositions prepared by ion exchange reaction of VIC montmorillonite (Nanocor, Inc.) (FIG. 4D) and by ion redistribution reaction of the homoionic parent end members (FIG. 4C). VIC montmorillonite has a layer charge density somewhat larger than CWC montmorillonite. Included in the Figure for comparison are the diffraction patterns of the homoionic parent end member clays containing octadecylammonium ion saturated galleries (FIG. 4B) and Na$^+$ saturated galleries (FIG. 4A). All samples were oven dried at 100° C. These results illustrate that hybrid mixed ion compositions according to the two structural embodiments of this invention are not limited to a single form of montmorillonite.

Figure 5:
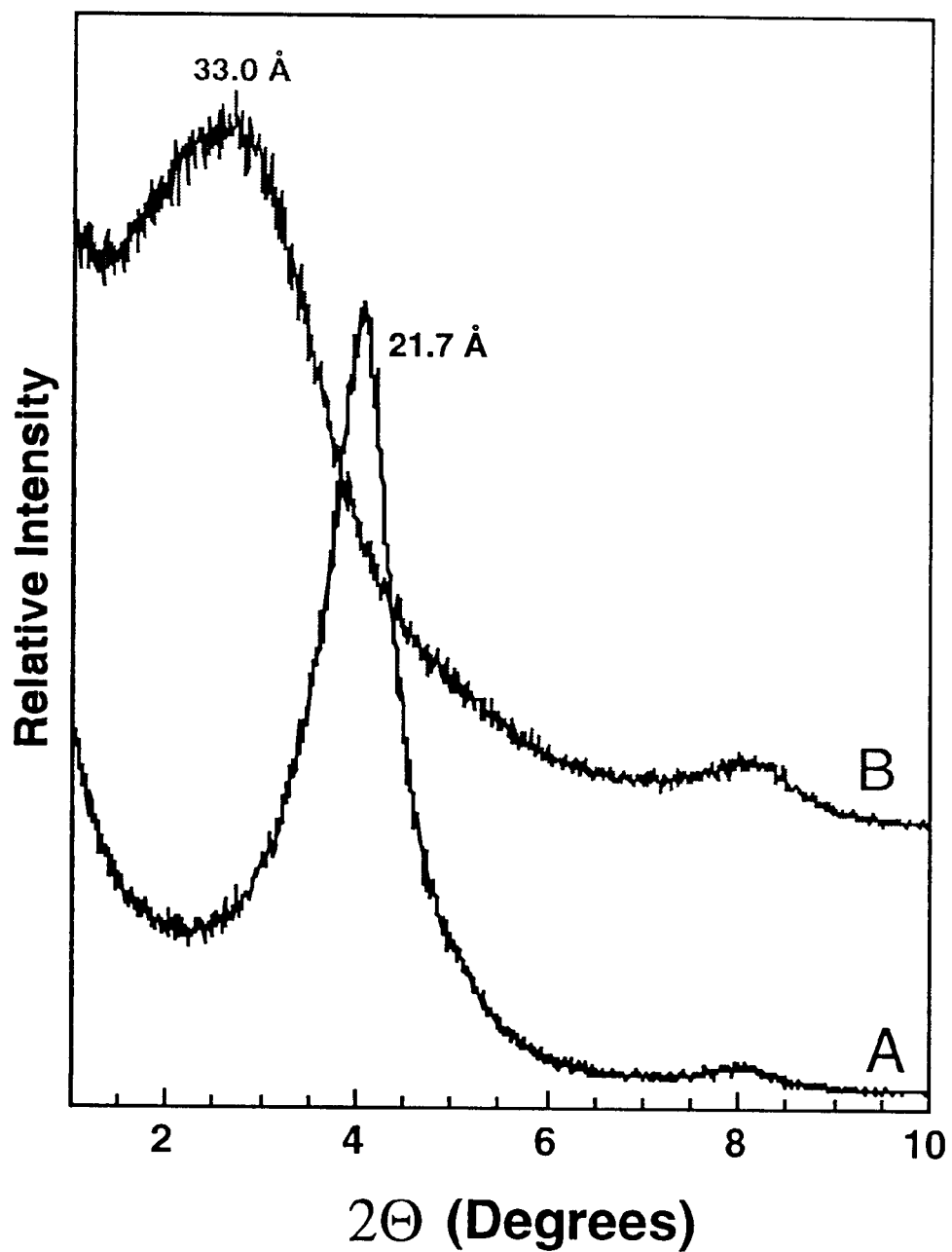
FIG. 5 is a graph showing XRD patterns of (A) a fully octadecylammonium exchanged CWC montmorillonite and (B) hybrid mixed ion CWC clay structure with the composition of onium ions to sodium ions near 50:50. This hybrid mixed ion clay structure was prepared through the following method. First, the pristine inorganic clay was mixed with a Brönsted acid to form a partial proton exchanged clay. Then, a desired amount of neutral amine was added to this partial proton exchange clay suspension to obtain the final product by acid-base reaction.

The hybrid compositions of this invention can also be prepared by forming the onium ions directly in the galleries of a proton exchange form of a 2:1 layered silicate. FIG. 5B illustrates the diffraction pattern of a hybrid mixed ion composition prepared by the reaction of a proton exchanged form of CWC montmorillonite (Nanocor, Inc.) with 0.5 equivalents of octadecylamine to form the corresponding octadecylammonium ions in the galleries of the clay by direct protonation. The hybrid composition, which contains a molar ratio of protons:onium ions near 50:50, exhibits a basal spacing of 33.0 Å, substantially larger than the spacing of the homoionic clay saturated with octadecylammonium ions (21.7 Å, FIG. 5A), and corresponding to the first structural embodiment of this invention.

Figure 6:
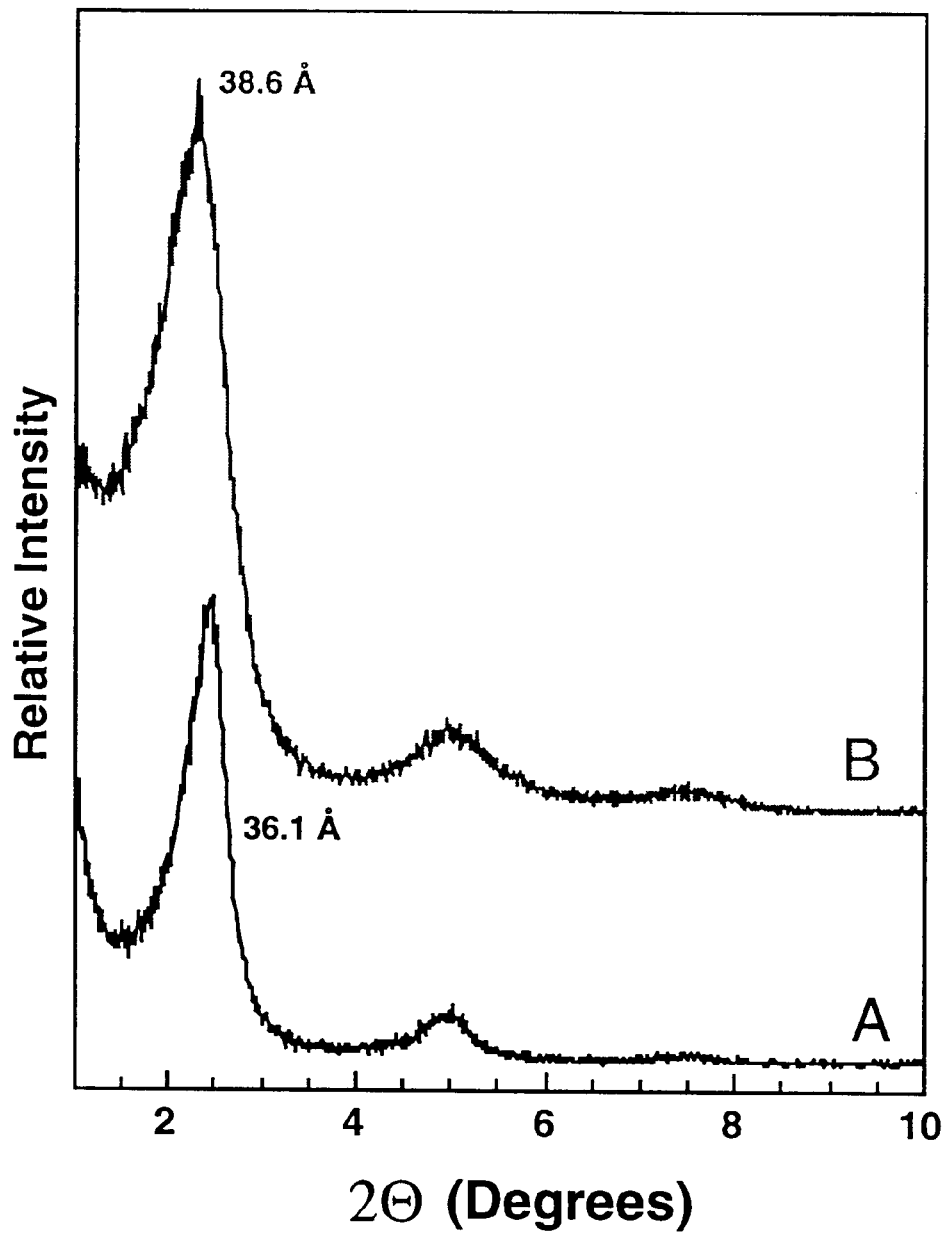
FIG. 6 is a graph showing XRD patterns for the epoxy resin solvated phases of (A) the fully octadecylammonium exchanged CWC montmorillonite and (B) its hybrid mixed ion clay structure with the composition of onium ions to protons near 50:50. The clays were solvated by EPON 828 resin at a temperature of 50° C.
Figure 7:
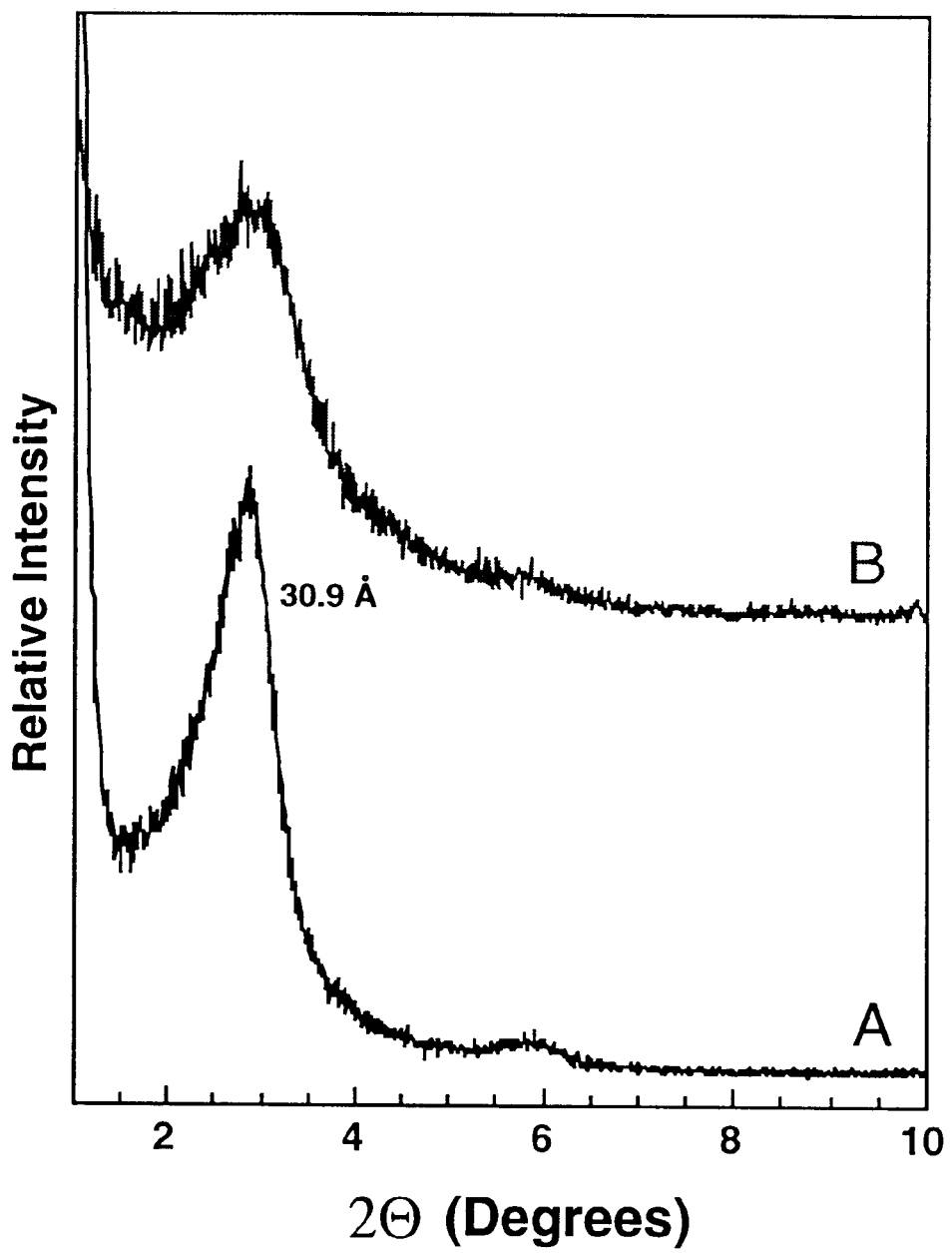
FIG. 7 shows XRD patterns for the caprolactam solvated phases of (A) the fully octadecylammonium exchanged CWC montmorillonite and (B) its hybrid mixed ion clay structure with the composition of onium ions to protons near 50:50. The clays were solvated by molten $\epsilon$-caprolactam at 100° C.

Both types of galleries comprising the hybrid mixed ion compositions of this invention, namely, the onium ion rich and inorganic ion rich galleries, can be swollen by the adsorption of organic guest molecules. Organic molecules that are polymer precursors are generally well suited for swelling the two types of galleries and this property makes the hybrid composition especially well suited for forming polymer clay nanocomposites in which the polymer has improved strength, barrier properties, and chemical resistance. The diffraction patterns in FIG. 6 show that a hybrid mixed ion clay composition containing gallery octadecylammonium ions and protons in about 50:50 molar ratio is even more susceptible to swelling by a EPON 828 resin (Shell) (basal spacing 38.6 Å, (FIG. 6B) than a fully saturated onium ion form of the clay (36.1 Å, FIG. 6A). This swelling property of the hybrid compositions is not limited to precursors of epoxy polymers and other thermal set polymers. Indeed, the hybrid compositions can also be swollen by precursors to thermal plastic polymers. The diffraction pattern of FIG. 7 shows that molten ε-caprolactam, the precursor to Nylon-6, swells the galleries of a 50:50 proton:octadecylammonium hybrid clay composition as effectively as a homoionic octadecylammonium ion clay. This swelling property of hybrid mixed ion clays can be extended to include swelling molten polymers and polymer precursors for the formation of polymer nanocomposites. Moreover, the hybrid compositions of this invention can be used as substitutes for higher cost homoionic onium ion clays not only in the production of polymer-clay nanocomposites, but also in many other applications, such as the rheological control of fluids.

The inorganic cations are preferably selected from the group consisting of protons, alkali metal and alkaline earth metal ions and mixtures thereof. The onium ions are selected from the group consisting of primary, secondary, tertiary and quaternary ammonium ions, phosphonium ions or sulfonium cations. The organo groups of the onium ions may be functionalized with groups for grafting the onium ions to a polymer matrix. There is no limit on the nature of organo groups that can be part of the onium ions.

The layered silicate is selected from the group consisting of a smectite clay, particularly montmorillonite, hectorite, saponite, nontronite, beidellite; synthetic smectite derivatives, particularly, fluorohectorite and laponite; mixed layered clays, particularly rectorite and illite; the synthetic mixed layered clays, particularly mica-montmorillonite, rectorite-like heterostructures; vermiculites; micas and hydromicas; and synthetic mica-like derivatives, particularly taeniolite, tetrasilicic mica and stevensite. Particularly useful for the preparation of the hybrid compositions are 2:1 layered silicates in which the anionic charge on the silicate layers is greater than about 0.9 charge equivalent per $O_{20}(OH)_4$, $O_{20}F_4$, or $O_{20}(OH,F)_4$ unit cell. For instance, commercially available AMS and CWC Nanocor montmorillonite clays with approximate unit cell formulas of $M_{0.92}[Mg_{0.86}Al_{3.06}](Si_{7.82}Al_{0.18})O_2(OH)_4$ and $M_{1.08}[Mg_{0.54}Al_{3.38}](Si_{7.64}Al_{0.36})O_{20}(OH)_4$ are well suited for forming the hybrid compositions. Nanocor VIC montmorillonite with a slightly higher layer charge density is also well suited for the formation of the mixed ion hybrid compositions of this invention. We note that cation exchange capacity is not a reliable measure of layer charge density, in part, because the cation exchange capacity is dependent on the method used to determine the exchange capacity. For example, Nanocor clays VIC montmorillonite and CWC montmorillonite have an apparent ion exchange capacity near 140 meq/100 g when measured by the binding of a methylene blue dye. However, the same clays give cation exchange capacity near 120 meq/100 when measured by the binding of ammonium ions. In general, a unit cell formula corresponding to a unit cell charge of about 0.9 units or greater is the preferred method for selecting a 2:1 layered silicate for the formation of the hybrid mixed ion composition of this invention.

In particular the present invention relates to the use of the said hybrid mixed ion compositions for the formation of polymer-clay nanocomposites by intercalating a polymer precursor or polymer melt into the galleries of the layered silicate, wherein the weight ratio of the polymer component to the layered inorganic composition is between about 1:100 and 100:1. The polymer precursor or polymer melt can produce a cross-linked thermoset polymer or thermoplastic polymer.

The polymer precursor or polymer melt is preferably selected from the group consisting of an amine, an amide, an imide, an anhydride, an epoxide, an isocyanate, a hydroxyl, a pyridinyl a pyrrolyl and a vinyl group.

Further, the present invention relates to a hybrid organic-inorganic composite material formed from a polymer and the said hybrid mixed ion layered silicate compositions, wherein the layered silicate composition has a weight ratio of polymer to layered silicate between about 200:1 and 1:100 and an average separation between the layers corresponds to a height of the galleries of about 0.4 to 300 nm. The compositions are formed by mixing the hybrid mixed ion clay composition with polymer precursors or polymer melt for forming a thermoset matrix by curing or a thermoplastic polymer matrix by polymerization or mixing. The polymer to be introduced into the galleries of the hybrid clay can preferably provide a cured thermoset polymer selected from the group consisting of an epoxy, a polyurethane, a polyurea, a polyester, an unsaturated polyester, a phenolic polymer, a polyimide, an alkyd, a polysiloxane, a polysulfide, and a rubber. The polymer to be introduced into the galleries can preferably provide a thermoplastic polymer selected from the group consisting of a polyamide, a polyester, a polyether, a polysulfide, a liquid crystal polymer, a polycarbonate, a polyalkylene oxide, a vinyl polymer and copolymer, a polyolefin polymer, a fluoropolymer, a vinyllidene polymer, a polysiloxane, a polyacetal, a polysulfone, a polyether sulfone, a cellulose, a protein, a polyimide. The cured polymer is preferably formed by an epoxy resin precursor and an amine curing agent, an anhydride curing agent, polyamide, catalytic curing agent. The epoxy polymer precursor to be introduced into the galleries is preferably selected from the group consisting of a diglycidyl ether of bisphenol A epoxide, a diglycidyl ether of bisphenol F epoxide, a Novolac epoxide, a N,N,N',N'-tetraglycidyl methylenedianiline, a triglycidyl p-aminophenol, a diglycidyl polyalkylene ether epoxide, an epoxypropoxypropyl terminated polydimethylsiloxane, and other aliphatic epoxides, epoxy reactive diluents, flexibilizers or the mixture of the above. Preferably the polymer polymerizing component is selected from the group consisting of a polyoxypropylene diamine, a polyoxypropylene triamine, a polyamide, and an aminopropyl terminated polydimethylsiloxane which provides crosslinking and curing of an epoxy resin and wherein the polymer precursor is an epoxy resin. The amine curing agent is preferably selected from the group consisting of a diethylenetriamine, triethylenetetramine, tetraethylenepentamine, polyethylenepolyamine, diethylaminepropylamine, diaminocyclohexane, aminoethylpiperazine, methylenedianiline, metaphenylene diamine, diaminodiphenylsulfone, 2,6-diamonopyridine, diethyltoluenediamine and mixture of the above or derivatives of the above. The anhydride curing agent is preferably selected from the group consisting of nadic methyl anhydride, hexahydrophthalic anhydride, trimellitic anhydride, dodecenyl succinic anhydride, succinic anhydride, phthalic anhydride, methyl hexahydrophthalic anhydride, tetrahydrophthalic anhydride, chlorendic anhydride, maleic anhydride, 3,3'4,4'-benzophenone-tetracarboxylic dianhydride, methyl tetrahydrophthalic anhydride and the derivatives of the above. The catalytic curing agent is preferably selected from the group consisting of benzyldimethylamine, $BF_3$ monoethyleneamine, dicyandiamide, dimethyl aminomethyl phenol, tris(dimethyl aminomethyl)phenol, alpha methylbenzyl dimethylamine, 2-ethyl-4-methylimidazole, stannous octoate and the derivatives of the above.

EXAMPLES 1 to 3

Examples 1 to 3 demonstrate a direct pathway method for preparing disordered hybrid mixed ion smectite clay by partial ion exchange reaction of an inorganic cation exchange form of the clay with onium ions.

A 400 mL of aqueous suspension containing 12.0 g (16.8 meq) of CWC montmorillonite clay (Nanocor, Inc.) in sodium cation exchange form (an industrial purified, high charge density smectite clay with a unit cell formula of $Na_{1.08}[Ng_{0.54}Al_{3.38}](Al_{0.36}Si_{7.64})O_{20}(OH)_4$ and with a methylene blue cation exchange capacity (CEC)=140 meq./100 g) was combined with another 600 mL of aqueous solution containing 2.57 g (8.40 mmol) of octadecylammonium chloride (abbreviated C18A.HCl), and blended at 80° C. using a household blender for 60 minutes. Both aqueous solutions were preheated to 80° C. before mixing. The resulting suspension containing the hybrid mixed ion CWC clay was centrifuged, washed with water, and air-dried. The air-dried product was converted to a powdered-form by blending using a commercial blender and the fraction of aggregated particles smaller than 140 mesh (106 μm) was collected and oven-dried at 100° C. for 24 hours under $N_2$ flow. Sample E1 exhibited a X-ray basal spacing of 36.1 Å (FIG. 2C) compared to spacings of 21.7 and 12.5 Å, respectively, for a fully exchanged octadecylammonium (FIG. 2A) and sodium exchanged forms of CWC montmorillonite that have been dried under analogous conditions. The ratio of onium ions to sodium ions was near 50:50.

Hybrid mixed ion clay samples E2 and E3 were prepared by using reaction conditions analogous to E1 except that the amount of C18A.HCl used in the reaction corresponded to 30% and 70%, respectively, of the CEC value of the initial $Na^+$ CWC clay, respectively. E2 exhibited a broad shoulder peak at low 2Θ angles (near a basal spacing of 42 Å (FIG. 2D) and E3 had a basal spacing of 29.2 Å (FIG. 2B).

EXAMPLE 4

Example 4 demonstrates a second method, denoted the parent clay ion redistribution pathway, for the preparation of hybrid mixed ion clay structures by mixing the parent homoionic organoclay and the parent inorganic exchange form of the clay in liquid suspension in the desired stoichiometric ratio.

A 45.0 g (63 meq) quantity of CWC montmorillonite clay in original sodium cation exchange form (methylene blue CEC=140 meq./100 g) was dispersed in 1500 mL of $H_2O$ and heated to about 80° C. A 55.2 g (63 meq) quantity of octadeclammonium exchanged homoionic organoclay was dispersed in 1500 mL of 1:1 (v/v) ethanol:water solution at 80° C. by blending using a commercial blender for 30 minutes. The mixture of these two suspensions was further blended at 75–100° C. for additional 60 minutes. The resulting suspension containing the hybrid mixed ion CWC clay heterostructure was centrifuged, washed with water, and air-dried. The air-dried product was converted to a powdered-form by blending using a commercial blender and the fraction of aggregated particles smaller than 140 mesh (106 μm) was collected and oven-dried at 100° C. for 24 hours under $N_2$ flow. Sample E4 exhibited a basal spacing of 23.6 Å(E4, FIG. 3B) compared to spacings of 21.7 and 12.5 Å, respectively, for fully octadecylammonium- and sodium-exchanged forms of the parent CWC clay (FIG. 3A). The ratio of onium ions to sodium ions was near 50:50, which was confirmed by the weight loss observed by thermal gravimetric (TGA) analysis.

EXAMPLES 5 AND 6

Examples 5 and 6 demonstrate the preparation of hybrid mixed onium ion clay heterostructures using an industrially purified, VIC montmorillonite clay, also obtained from Nanocor, Inc., with a methylene blue CEC value around 140 meq/100 g.

Hybrid mixed ion VIC montmorillonite clay E5 was prepared by using reaction conditions analogous to those employed in Example E1 (the direct ion exchange pathway) with the amount of C18A.HCl corresponding to 50% of the CEC value of the VIC clay. Hybrid mixed ion VIC clay E6 was prepared by using reaction conditions analogous to E5 (parent pathway) with the ratio of onium ions to sodium ions near 50:50.

Samples E5 and E6 exhibited basal spacings around 45 Å (FIG. 4D) and 29.6 Å (FIG. 4C), respectively, compared to basal spacings of 21.7 (FIG. 4B) and 12.5 Å (FIG. 4A), respectively, for the fully octadecylammonium- and sodium-exchanged VIC clay.

EXAMPLE 7

Example 7 demonstrates a third method for the preparation of a hybrid mixed ion clay structure. The pristine inorganic clay was first mixed with a Brönsted acid to form a partial proton exchanged clay. Then a desired amount of neutral amine was added to this partial proton exchange clay suspension to obtain the final product by acid-base reaction.

A 9.0 g (12.6 meq) of CWC clay in original sodium cation exchange form (methylene blue CEC=140 meq./100 g) was dispersed in 300 mL of $H_2O$ and preheated to about 80° C. This clay suspension was treated with 21.4 mL of 0.295 N HCl (6.3 mmol) by blending for 10 minutes using a household blender. This partial proton exchanged clay suspension was further combined with another 300 mL of aqueous suspension containing 1.70 g of octadecylamine (6.3 mmol) that had been preheated to 80° C. The mixture was blended at 75–100° C. for additional 1–2 hours. The resulting suspension containing the hybrid mixed ion CWC clay structure was centrifuged, washed with water, and air-dried. The air-dried product was converted to a powdered-form by blending using a commercial blender and the fraction of aggregated particles smaller than 140 mesh (106 μm) was collected and oven-dried at 100° C. for 24 hours under $N_2$ flow. Sample E7 exhibits a basal spacing of 33.0 Å (E7, FIG. 5B) compared to a 21.7 Å for a fully octadecylammonium exchanged CWC organoclay (FIG. 5A). The ratio of onium ions to sodium ions was near 50:50.

EXAMPLES 8 and 9

Examples 8 and 9 illustrate the use of hybrid mixed ion clay heterostructures as reagents for the formation of organic polymer-clay nanocomposites. The polymer matrices selected as examples were cross-linked thermoset polymer of thermoplastic polymer.

The swelling properties of the hybrid mixed ion CWC clay structure by a polymer precursor was demonstrated as follows. A 0.3 g of sample E4 was mixed with 1.7 g of EPON 828 epoxy resin from Shell by stirring with a magnetic stirrer for 30 minutes at temperature of 50° C. The XRD pattern of the solvated phase of E8 is shown in FIG. 6B in comparison with the solvated form of a fully exchanged CWC organoclay as in FIG. 6A. The gallery expansion for both samples is very similar, even though the hybrid mixed ion clay contains half as many onium ions or the fully exchanged onium ion clay. Epoxy-clay nanocomposites were easily formed after the addition of stoichiometric amount of a desired curing agent to the above epoxide and clay mixture, followed by a subsequent curing reaction.

The organophilic swelling properties for the hybrid mixed ion CWC clay structure was further demonstrated by another example when the hybrid mixed ion CWC clay from Example 5 was mixed with molten ε-caprolactam, the monomer for formation of nylon-6 polymers. A 0.30 g of sample E5 was mixed with 2.7 g of ε-caprolactam from Aldrich by stirring at temperature of 100° C. The gallery expansion for the hybrid mixed ion CWC clay structure (FIG. 7B) was very similar to the expansion observed for the fully exchanged CWC organoclay (FIG. 7A). Nylon 6-clay nanocomposites were formed by further polymerization reaction.

The intercalation properties of hybrid mixed ion clay heterostructures are very similar to the fully exchanged homoionic organoclays. The hybrid mixed ion clay structures can replace the homoionic organoclays which consume more expensive surfactants, and can be widely used in many applications.

It is intended that the foregoing description be only illustrative of the present invention and that the present invention be limited only by the hereinafter appended claims.

We claim:

1. A hybrid 2:1 layered silicate composition consisting essentially of mixed organic and inorganic exchange cations in galleries which are between the silicate layers, wherein a first set of the galleries are mixed inorganic ions and organic onium ions and a second set of the galleries are mixed inorganic and organic cations that alternate irregularly with the first set of the galleries, wherein the first and second sets of the galleries contain different amounts of the organic onium ions, wherein the overall ratio of organic to inorganic ions defining the hybrid composition is between 25 to 75 and 75 to 25, wherein the initial hybrid layered silicate composition exhibits a x-ray basal spacing $d_{obs}$ that is either (i) greater than a sum of the basal spacings observed for the organic ion saturated exchanged form of the 2:1 silicate $(d_o)$ and the saturated inorganic ion exchanged form of the silicate $(d_I)$ alone or (ii) is less than a sum of the basal spacing for $d_o+d_I$ and is greater than the basal spacing $d_o$ after heating at 100° C. and wherein the hybrid 2:1 layered silicate composition is prepared from an inorganic ion exchanged silicate composition with a cation capacity of at least 90 meq per 100 g.

2. The heterostructure of claim 1 wherein the inorganic metal containing ions are selected from the group consisting of alkali metal ions, alkaline earth metal ions and mixtures thereof.

3. The heterostructure of any one of claims 1 or 2 wherein the onium ions are selected from the group consisting of primary, secondary, tertiary and quaternary ammonium ions, phosphonium ions and sulfonium cations.

4. The heterostructure of any one of claims 1 or 2 wherein the 2:1 layered silicate is selected from the group consisting of a smectite clay, a mixed layered clay, a synthetic mixed layered clay, a mica, a hydromica, and a synthetic mica.

5. A composite composition which comprises:
(a) a hybrid 2:1 layered silicate composition which initially consists essentially of mixed organic and inorganic exchange cations ions in galleries which are between the silicate layers, wherein a first set of the galleries are mixed inorganic ions and organic ions and a second set of the galleries are mixed inorganic and organic cations that alternate irregularly with the first set of the galleries, wherein the first and second sets of the galleries contain different amounts of the organic onium ions, wherein the overall ratio of organic to inorganic ions defining the hybrid composition is between 25 to 75 and 75 to 25, wherein the initial hybrid layered silicate composition exhibits a x-ray basal spacing $d_{obs}$ that is either (i) greater than a sum of the basal spacings observed for the organic ion saturated exchanged form of the 2:1 silicate($d_o$) and the saturated inorganic ion exchanged form of the silicate ($d_I$) alone or (ii) is less than a sum of the basal spacing for $d_o+d_I$ and is greater than the basal spacing $d_o$ after heating at 100° C. and wherein the hybrid 2:1 layered silicate composition is prepared from an inorganic ion exchanged silicate composition with a cation capacity of at least 90 meq per 100 g; and (b) a polymer forming material or polymer material inserted into the mixed ion galleries of the initial hybrid 2:1 layered silicate composition.

6. The composite structure of claim 5 wherein the polymer forming material is a polymer precursor.

7. The composition of claim 5 wherein the polymer forming material is a thermoplastic polymer which has been melted into the two sets of galleries.

8. The composition of claim 5 wherein the polymer forming material is selected from the group consisting of an amine, an amide, an imide, an anhydride, an epoxide, an isocyanate, a hydroxyl, an acid, a pyridinyl, a pyrrolyl and a vinyl compound which is polymerizable to form a polymer.

9. The composition of claim 5 wherein the polymer material is a cured thermoset polymer selected from the group consisting of an epoxy, a polyurethane, a polyurea, a polyester, an unsaturated polyester, a phenolic polymer, a polyimide, an alkyd, a polysiloxane, a polysulfide and a rubber.

10. The composition of claim 5 with the polymer material is a thermoplastic polymer selected from the group consisting of an epoxy, a polyamide, a polyester, a polyether, a polysulfide, a liquid crystal polymer, a polycarbonate, a polyalkylene oxide, a vinyl polymer and copolymer, a polyolefin polymer, a fluoropolymer, a vinyllidene polymer, a polysiloxane, a polyacetal, a polysulfone, a polyether sulfone, a cellulose, a protein and a polyimide.

11. The composition of claim 5 wherein the polymer material is formed by reaction of an epoxy resin precursor and a curing agent selected from the group consisting of an amine, an anhydride, a polyamide and a catalytic compound.

12. The composition of claim 11 wherein the epoxy resin precursor is selected from the group consisting of a diglycidyl ether of bisphenol A epoxide, a diglycidyl ether of bisphenol F epoxide, a Novolac epoxide, a N,N,N',N'-tetraglycidyl methylenedianiline, a triglycidyl p-aminophenol, a diglycidyl polyalkylene ether epoxide, an epoxypropoxypropyl terminated polydimethylsiloxane, and aliphatic epoxide, and mixtures thereof and optionally epoxy reactive diluents, flexibilizers and mixtures thereof.

13. The composition of claim 5 wherein the polymer material is produced by the reaction of epoxy resin and a curing agent selected from the group consisting of a polyoxypropylene diamine, a polyoxypropylene triamine, a polyamide, and an aminopropyl terminated polydimethylsiloxane.

14. The composition of claim 5 wherein the polymer forming material is an amine curing agent and is selected from the group consisting of a diethylenetriamine, triethylenetetramine, tetraethylenepentamine, polyethylenepolyamine, diethylaminepropylamine, diaminocyclohexane, aminoethylpiperazine, methylenedianiline, metaphenylene diamine, diaminodiphenylsulfone, 2,6-diamonopyridine, diethyltoluenediamine and mixtures thereof.

15. The composition of claim 5 wherein the polymer forming material is an anhydride curing agent and is selected from the group consisting of nadic methyl anhydride, hexahydrophthalic anhydride, trimellitic anhydride, dodecenyl succinic anhydride, succinic anhydride, phthalic anhydride, methyl hexahydrophthalic anhydride, tetrahydrophthalic anhydride, chlorendic anhydride, maleic anhydride, 3,3',4,4'-benzophenone-tetracarboxylic dianhydride, methyl tetrahydrophthalic anhydride and mixtures thereof.

16. The composition of claim 5 wherein the polymer forming material is a catalytic curing agent and is selected from the group consisting of benzyldimethylamine, $BF_3$ monoethyleneamine, dicyandiamide, dimethyl aminomethyl phenol, tri(dimethyl aminomethyl)phenol, alpha methylbenzyl dimethylamine, 2-ethyl-4-methylimidazole, stannous octoate and the mixtures thereof.

17. A process for forming a hybrid mixed organic-inorganic ion 2:1 layered silicate which comprises:

(a) providing an inorganic ion exchanged form of a 2:1 layered silicate with a cation exchange capacity of at least about 90 meq per 100 g containing metal ions in galleries between the layers and without organic ions in the galleries; and (b) introducing organic onium ions so that a first set of the galleries are mixed inorganic and organic ions and a second set of the galleries are mixed inorganic and organic ions between the silicate layers, wherein the first and second sets of the galleries contain different amounts of the organic ions, wherein the overall ratio of organic to inorganic ions is between 25 to 75 and 25 to 75, wherein the resulting hybrid layered silicate exhibits an x-ray basal spacing ($d_{obs}$) that is either (i) greater than the sum of the basal spacings for the organic ion saturated exchange form of the layered silicate ($d_o$) and the inorganic ion saturated exchanged form of the layered silicate after drying at 100° C., or (ii) is less than a sum of the basal spacing for $d_o$ and $d_I$ is greater than the basal spacing of the $d_o$ after dehydration at 100° C.

18. The process of claim 17 wherein the inorganic metal ions are selected from the group consisting of alkali metal, alkaline earth metal ions and mixtures thereof.

19. The process of claim 17 wherein the onium ions are introduced into the homogeneous layer silicate of step (a) in a solvent.

20. The process of claim 17 wherein the onium ions are introduced into the heterostructure by ion exchange between the homogeneous layered silicate and a homogeneous silicate containing the onium ion.

21. A method for forming hybrid mixed organic-inorganic ion 2:1 layered silicate-polymer composite compositions which comprises:

(a) providing a hybrid 2:1 layered silicate composition which initially consists essentially of a mixed organic and inorganic exchange cations in galleries between the silicate layers, wherein a first set of the galleries are mixed inorganic ions and organic ions and a second set of the galleries are mixed inorganic and organic ions that alternate irregularly with the first set of the galleries, wherein the first and second sets of the galleries contain different amounts of organic onium ions wherein the overall ratio of organic to inorganic ions defining the hybrid composition is between 25 to 75 and 75 to 25, wherein the initial hybrid layered silicate composition exhibits a x-ray basal spacing $d_{obs}$ that is either (i) greater than a sum of the basal spacings observed for the organic ion saturated exchanged form of the 2:1 silicate ($d_o$) and the saturated inorganic ion exchanged form of the silicate ($d_I$) alone or (ii) is less than a sum of the basal spacing for $d_o+d_I$ and is greater than the basal spacing $d_o$ after heating at 100° C. and wherein the hybrid 2:1 layered silicate composition is prepared from an inorganic ion exchanged silicate composition with a cation capacity of at least 90 meq per 100 g; and (b) introducing a polymer forming material or a polymer material into the galleries of the hybrid mixed ion silicate to form a composite material.

22. The method of claim 21 wherein the polymer forming material is selected from the group consisting of an amine, an amide, an imide, an anhydride, an epoxide, an isocyanate, a hydroxyl, and a pyridinyl, a pyrrolyl and a vinyl compound which is polymerizable to form a polymer.

23. The method of claim 21 with the polymer forming material provides a cured polymer selected from the group consisting of an epoxy, a polyurethane, a polyurea, a polyester, an unsaturated polyester, a phenolic polymer, a polyamide, an alkyd, a polysiloxane, a polysulfide and a rubber.

24. The method of claim 21 with the polymer material is selected from the group consisting of an epoxy, a polyamide, a polyester, a polyether, a polysulfide, a liquid crystal polymer, a polycarbonate, a polyalkylene oxide, a vinyl polymer and copolymer, a polyolefin polymer, a fluoropolymer, a vinyllidene polymer, a polysiloxane, a polyacetal, a polysulfone, a polyether sulfone, a cellulose, a protein and a polyimide.

25. The method of claim 21 wherein the polymer material is formed by reaction of an epoxy resin precursor and a curing agent selected from the group consisting of an amine, an anhydride, a polyamide and a catalytic curing compound.

26. The method of claim 25 wherein the epoxy polymer precursor and is selected from the group consisting of a diglycidyl ether of bisphenol A epoxide, a diglycidyl ether of bisphenol F epoxide, a Novolac epoxide, a N,N,N',N'-tetraglycidyl methylenedianiline, a triglycidyl p-aminophenol, a diglycidyl polyalkylene ether epoxide, an epoxypropoxypropyl terminated polydimethylsiloxane, and an aliphatic epoxide or mixtures thereof, and optionally epoxy reactive diluents, flexibilizers and mixtures thereof.

27. The method of claim 21 wherein the polymer material is prepared by reaction of an epoxy resin precursor and a curing agent selected from the group consisting of a polyoxypropylene diamine, a polyoxypropylene triamine, a polyamide, and an aminopropyl terminated polydimethylsiloxane.

28. The method of claim 21 wherein the polymer forming material is an amine and is selected from the group consisting of a diethylenetriamine, triethylenetetramine, tetraethylenepentamine, polyethylenepolyamine, diethylaminepropylamine, diaminocyclohexane, aminoethylpiperazine, methylenedianiline, metaphenylene diamine, diaminodiphenylsulfone, 2,6-diamonopyridine, diethyltoluenediamine and mixtures thereof.

29. The method of claim 21 wherein the polymer forming material is an anhydride curing agent is selected from the group consisting of nadic methyl anhydride, hexahydrophthalic anhydride, trimellitic anhydride, dodecenyl succinic anhydride, succinic anhydride, phthalic anhydride, methyl hexahydrophthalic anhydride, tetrahydrophthalic anhydride, chlorendic anhydride, maleic anhydride, 3,3',4,4'-benzophenone-tetracarboxylic dianhydride, methyl tetrahydrophthalic anhydride and mixtures thereof.

30. The method of claim 21 wherein the polymer forming material is a catalytic curing agent is selected from the group consisting of benzyldimethylamine, $BF_3$ monoethyleneamine, dicyandiamide, dimethyl aminomethyl phenol, tri(dimethyl aminomethyl)phenol, alpha methylbenzyl dimethylamine, 2-ethyl-4-methylimidazole, stannous octoate and the mixtures thereof.

31. A process for forming a hybrid mixed organic-inorganic ion form of a 2:1 layered silicate with the ions in galleries which comprises:

(a) mixing an organic onium ion saturated and an inorganic ion saturated exchanged form of a 2:1 layered silicate in water in a molar ratio of organic ion saturated silicate to inorganic ion saturated silicate between 25 to 75 and 75 to 25 wherein the inorganic ion saturated exchange form of the 2:1 layered silicate is with a cation capacity of at least 90 meq per 100 g; and (b) filtering and drying the reaction product at 100° C. to form hybrid mixed organic and inorganic mixed ion composition wherein the initial hybrid layered silicate composition exhibits a x-ray basal spacing $d_{obs}$ that is either (i) greater than a sum of the basal spacings observed for the organic ion saturated exchanged form of the 2:1 silicate ($d_o$) and the saturated inorganic ion exchanged form of the silicate ($d_I$) alone or (ii) is less than a sum oL the basal spacing for $d_o+d_I$ and is greater than the basal spacing $d_o$ after heating at 100° C.

32. The process of claim 31 wherein the inorganic metal ions are selected from the group consisting of alkali metal, alkaline earth metal ions or mixtures thereof.

33. The process of claim 31 wherein the onium ions are introduced into the homogeneous layer silicate used in step (a) in a solvent.

34. The process of claim 31 wherein the onium ions are introduced into the heterostructure by ion exchange between the homogeneous layered silicate and a homogeneous silicate containing the onium ion.

35. The composition of claim 1 wherein the onium ions are a primary amine.

36. The process of claim 17 wherein the onium ions are a primary amine.

37. The method of claim 21 wherein the onium ions are a primary amine.

38. The process of claim 31 wherein the onium ions are a primary amine.

* * * * *

UNITED STATES PATENT AND TRADEMARK OFFICE
CERTIFICATE OF CORRECTION

PATENT NO. : 6,414,069 B1
DATED : July 2, 2002
INVENTOR(S) : Thomas J. Pinnavaia and Zhen Wang It is certified that error appears in the above-identified patent and that said Letters Patent is hereby corrected as shown below:

Column 8,
Line 13, "ions" after "cations" and before "in" should be deleted.
Lines 50 and 51, "between 25 to 75 and 25 to 75" should be -- between 25 to 75 and 75 to 25 --.

Column 11,
Lines 46 and 47, "$d_o>d_{obs}$" should be -- $d_o>d_{obs}$ --.
Line 48, "$(d_1 + {}_{do})$" should be -- $(d_1 + d_o)$ --.

Column 16,
Line 43, "oactadeclammonium" should be -- octadecylammonium --.

Column 20,
Lines 27 and 28, "25 to 75 and 25 to 75" should be -- 25 to 75 and 75 to 25 --.
Line 66, "silicate $(d_i)$ alone" should be -- silicate $(d_I)$ alone --.

Column 22,
Line 35, "sum oL the" should be -- sum of the --.

Signed and Sealed this

Seventh Day of January, 2003

JAMES E. ROGAN
*Director of the United States Patent and Trademark Office*